US00RE39589E

(19) United States
(12) Reissued Patent
Raivisto

(10) Patent Number: US RE39,589 E
(45) Date of Reissued Patent: Apr. 24, 2007

(54) SECURITY METHOD FOR TRANSMISSIONS IN TELECOMMUNICATION NETWORKS

(75) Inventor: Tommi Raivisto, Vantaa (FI)

(73) Assignee: Nokia Networks Oy, Espoo (FI)

(21) Appl. No.: 10/936,830

(22) Filed: Sep. 9, 2004

Related U.S. Patent Documents

Reissue of:
(64) Patent No.: 6,449,473
Issued: Sep. 10, 2002
Appl. No.: 09/521,759
Filed: Mar. 9, 2000

U.S. Applications:

(63) Continuation of application No. PCT/FI98/00721, filed on Sep. 15, 1998.

(51) Int. Cl.
*H04M 1/66* (2006.01)
*H04M 1/68* (2006.01)
*H04M 3/16* (2006.01)

(52) U.S. Cl. ..... 455/410; 455/411; 380/283; 380/284

(58) Field of Classification Search ..... 455/410–411; 380/277–286; 713/168–181
See application file for complete search history.

(56) References Cited

U.S. PATENT DOCUMENTS 4,607,137 A * 8/1986 Jansen et al.
4,856,063 A * 8/1989 McCalmont ..... 380/262
5,241,599 A * 8/1993 Bellovin et al. ..... 713/171
5,602,917 A * 2/1997 Mueller ..... 380/284
5,812,667 A * 9/1998 Miki et al. ..... 380/249
5,854,841 A 12/1998 Nakata et al.
5,905,445 A * 5/1999 Gurney et al. ..... 340/5.72
5,966,449 A * 10/1999 Iwamura et al. ..... 380/44
5,991,405 A * 11/1999 Mills ..... 380/247
6,014,444 A * 1/2000 Nakamura et al. ..... 380/260
6,125,185 A * 9/2000 Boesch ..... 380/285
6,157,722 A * 12/2000 Lerner et al. ..... 380/260
6,157,723 A * 12/2000 Schultz ..... 380/273
6,230,002 B1 * 5/2001 Floden et al. ..... 455/411

FOREIGN PATENT DOCUMENTS

EP 0 189 823 * 1/1986
JP 01-288131 11/1989
JP 06006615 1/1994
WO WO 95/06374 3/1995
WO 95/08232 * 3/1995
WO 95/26087 * 9/1995

OTHER PUBLICATIONS

Davies et al, "Security for Computer Networks", Nikkei MacGrow Hill–Sha, Dec. 5, 1985, pp. 126–128. (with English Translation).

Mar. 25, 1999, International Search Report for PCT/FI98/00721.*

* cited by examiner

*Primary Examiner*—Quochien B. Vuong
*Assistant Examiner*—Tuan Tran
(74) *Attorney, Agent, or Firm*—Squire Sanders & Dempsey L.L.P.

(57) ABSTRACT

The invention related to method for providing connection security for the transmission between communicating parties in a telecommunication network, the method comprising the steps of: exchanging security parameters between communicating parties, providing connection security for messages based on these security parameters, and transmitting said messages between communicating parties. It is characteristic for the method according to the invention that it further comprises the steps of: reaching agreement between communicating parties on an interval for recalculation of the security parameters, monitoring of the interval for recalculation by the communicating parties, recalculating the security parameters at the agreed interval, and providing connection security for messages based on the latest recalculated security parameters.

31 Claims, 2 Drawing Sheets

SECURITY METHOD FOR TRANSMISSIONS IN TELECOMMUNICATION NETWORKS

Matter enclosed in heavy brackets [ ] appears in the original patent but forms no part of this reissue specification; matter printed in italics indicates the additions made by reissue.

This application is a continuation of PCT/FI98/00721 filed Sep. 15, 1998.

FIELD OF THE INVENTION

The invention relates to a method for providing connection security for transmission between the communicating parties in a telecommunication network.

BACKGROUND OF THE INVENTION

At the beginning of a communication a handshake is usually performed between applications in telecommunication networks, during which the parties involved typically authenticate each other and exchange key information, for example, negotiate an encryption algorithm and cryptographic keys to be used in communication. It is only after the handshake that the actual data is transmitted. The confidentiality of the transmission is arranged, for example, through ciphering. FIGS. 1a and 1b of the attached drawings show block diagrams of two known cipher algorithms which can be used to protect a transmission: a symmetric and a public key algorithm.

FIG. 1a shows a symmetric algorithm based on a secret key shared between the participants. At party A's end the message M to be sent to party B is encrypted in box E of FIG. 1a with the shared secret key K. The messages is sent over a transmission route as encrypted cipher text C, which party B can decrypt in box D shown in FIG. 1a with the same secret key K. Through decryption party B gets the original message M. An intruder eavesdropping transmission needs to know the secret key K in order to be able to read and understand the transmitted cipher text C. The encryption and decryption of the symmetric algorithm can be expressed by the equations:

$$C=E_K(M)$$

$$M=D_K(C),$$

where C is the cipher text, M is the message in plain text, $E_K$ is the encryption with key K, and $D_K$ is the decryption with key K.

FIG. 1b shows a public key algorithm which is an asymmetric approach. This algorithm is based on two keys: a public key and a private key. These two keys are related in such a manner that a message encrypted with a public key $K_+$ can only be decrypted with the corresponding private key K_ and vice versa. In FIG. 1b a message M is encrypted at party A's end in box E with the public key $K_+$ of the intended receiver, that is party B. The encrypted cipher text C is transmitted over a transmission line to party B's end, where the cipher text C is decrypted in box D with the corresponding party B's private key K_ and the original message M is retrieved. The encryption and decryption of the asymmetric algorithm can also be expressed by the following equations:

$$C=E_B^+(M)$$

$$M=D_B^-(C),$$

where C is the cipher text, M is the message in plain text, $E_B^+$ is encryption with the receiver's public key $K_B^+$, and $D_B^-$ is decryption with the receiver's private key $K_B^-$.

In the public key algorithm the encryption of a message with the private key K_ of the message sender acts as a signature, since anyone can decrypt the message with the known public key $K_+$ of the sender. Since asymmetric keys are usually much longer than symmetric keys, the asymmetric algorithm requires much more processing power. Thus asymmetric algorithms are unsuitable for encrypting large amounts of data.

A hybrid cryptography uses both the above-mentioned algorithms together. For example, only session keys are exchanged using public key algorithm, and the rest of the communication is encrypted with symmetric method.

To provide message integrity and authentication in a connection, a message authentication code MAC is calculated and attached to the transmitted message. For example, MAC can be calculated with a one-way hash algorithm in the following way:

$$h=H(K, M, K),$$

where K is the key, M is the message, and H is the hash function. The input cannot be deduced from the output. When MAC is attached to a message, the message cannot be corrupted or impersonated. The receiving party calculates MAC using the received message and the same hash function and key as the transmitting party and compares this calculated MAC to the MAC attached to the message in order to verify it.

FIG. 2 shows examples for communication connections. A mobile station MS operating in the GSM network (Global System for Mobile communications) is able to make a connection to a bank directly from the GSM network. Other possible connections presented in FIG. 2 are connections from the GSM network to different services via gateway GW and Internet. In mobile communication networks, such as the GSM, the air interface from the mobile station MS to the GSM network is well protected against misuse, but the rest of the transmission route is as vulnerable as any other public telephone network, providing measures are not taken to provide connection security.

One problem with providing connection security is that handshaking requires plenty of processing time since several messages must be sent between the parties involved. The low processing power and narrow bandwidth in the mobile stations make handshakes particularly burdensome in mobile communication networks. Handshakes are also burdensome for applications which have numerous simultaneous transactions, for example, a server in a bank. Therefore, it is desirable to minimize the number and duration of the handshakes. This leads to the problem that an attacker has lots of time for cryptanalysis, as the same encryption keys are used between the two handshakes. If the attacker succeeds in the cryptanalysis, he can access all the material sent between the two handshakes.

SUMMARY OF THE INVENTION

The object of this invention is to provide a method for securely protecting transmitted information between communicating applications, especially over narrow-band connections, without unnecessarily loading the communicating parties.

This is achieved by using a method according to the invention characterized by what is stated in the independent claim 1. Special embodiments of the invention are presented in the dependent claims.

The invention is based on the idea that the communicating parties recalculate the security parameters during the transmission session simultaneously with each other at agreed intervals and the continue communicating and providing connection security for messages with these new parameters. The communicating parties monitor the time for recalculation and at the agreed intervals recalculate and thus change the security parameters without a handshake taking place. In the primary embodiment of the invention, the messages are numbered and the number agreed on triggers recalculation at intervals.

The advantage of the method according to the invention is that security parameters can be changed during the session without handshaking. This reduces the need for handshakes.

Another advantage of the method according to the invention is that the security of the transmission is improved, i.e. attacking is made more difficult and less profitable.

BRIEF DESCRIPTION OF THE DRAWINGS

The description of the preferred embodiments of the invention will now be made with reference to the attached drawings, in which.

DETAILED DESCRIPTION OF THE INVENTION

The present invention can be applied to any telecommunication network. Below the invention is described in more detail using as an example a mobile station operating in the digital GSM mobile communication system and communicating with an application located either inside or outside the GSM network.

In the following the primary embodiment of the invention is described in more detail with reference to FIGS. 2, 3 and 4.

Figure 1A:
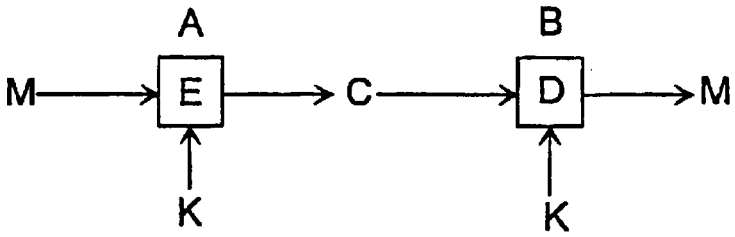
FIG. 1a shows a symmetric ciphering algorithm as a block diagram.
Figure 1B:
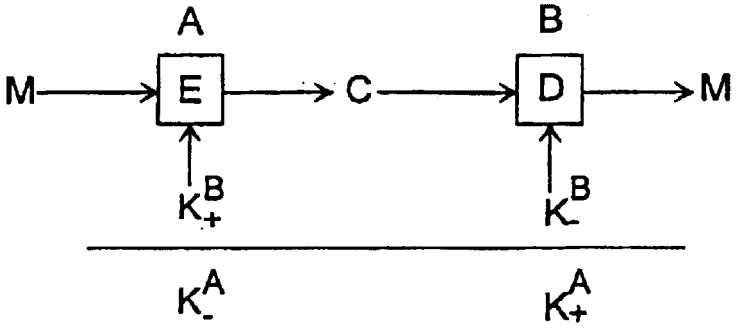
FIG. 1b shows an asymmetric ciphering algorithm as a block diagram.
Figure 2:
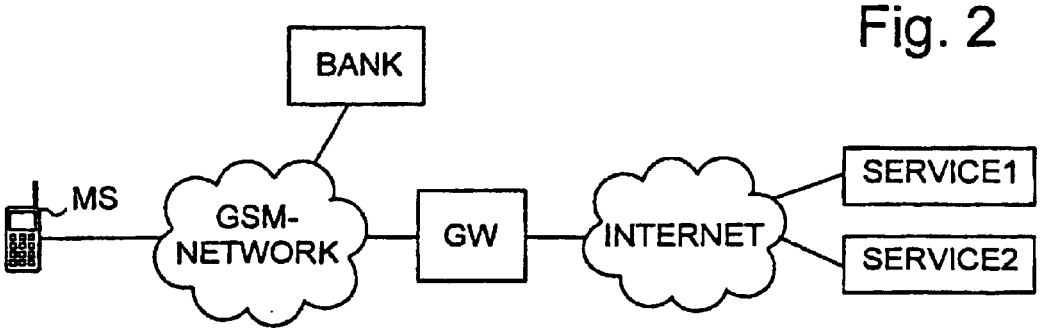
FIG. 2 gives a few examples of connections from a mobile communication network to some applications.

FIG. 2 shows example connections as described earlier. The mobile station MS contacting the server in the bank first performs a handshake according to the prior art, during which both the MS and the bank may authenticate the other and exchange any session key information needed. According to the invention, for example, during the handshake, a mobile station and an application in the bank negotiate and agree on appropriate intervals for recalculating the security parameters to be used to provide privacy, data integrity and authentication during the communication. For example, the negotiation can be implemented so that each of the communicating parties, i.e. in the example in FIG. 2 the mobile station MS and the application in the bank, propose a suitable interval for recalculation and one of the proposed intervals is chosen and agreed upon, for example, the one that is more frequent. Examples for suitable parameters to determine intervals are a message sequence number, such as every fourth message, or a suitable time period. Even if handshaking is not needed and therefore not performed at the beginning of the communication session, according to the invention the communicating parties still need to agree on recalculation intervals.

After agreeing on the intervals for recalculation both the parties monitor the agreed intervals. If an interval after four messages is agreed on, either both parties monitor the number of messages sent, which requires a reliable transmission media with no lost messages, or they number all transmitted messages and transmit these sequence numbers with the messages. The advantage of sending the sequence numbers or time stamps with the messages is that the recalculation is synchronous at both ends even though some messages get lost along the way or messages received are not in correct order. When in the example described above the fourth message is transmitted and received, both the communicating parties recalculate the security parameters and use these new parameters for providing connection security for the next four messages. A handshake or any other session key exchange is not performed during or after the recalculation of the parameters. The recalculation can be based on a shared secret and the latest sequence number, for example. Security parameters can also be used to calculate session keys Kn for ciphering and the message authentication code MAC in the following way, for example:

$$Kn=H(S, N)$$

$$MAC=H(M, S, N),$$

where H is a predetermined hash algorithm, S is the shared secret, N is the latest sequence number, and M is the message to be transmitted in plain text.

Figure 3:
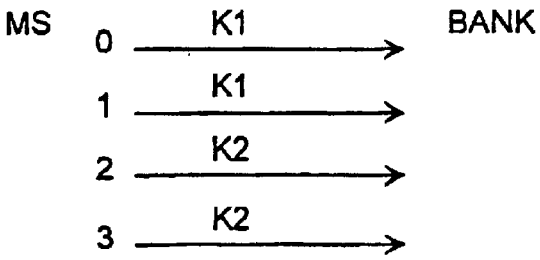
FIG. 3 shows session keys providing connection security for transmitted messages according to the primary embodiment of the invention.

FIG. 3 shows an example of changing the session key according to the invention. In FIG. 3 the messages sent from the MS are numbered with the sequence numbers 0 to 3. In the example in FIG. 3, the interval for recalculation is agreed to be after two sent messages. The message with sequence number 0 is sent to the bank encrypted with session key K1. The application in the bank decrypts the message 0 with the same session key K1 when symmetric algorithm is applied in ciphering. The message with sequence number 1 is also sent encrypted with session key K1. As the mobile station MS has now sent two messages, both the MS and the application in the bank recalculate the security parameters, for example, the session key K2, using the shared secret and the latest sequence number that is 1. After recalculation the MS sends the next message 2 to the bank encrypted with session key K2. The application in the bank decrypts the message 2 with the same recalculated session key K2. Also the message 3 is encrypted with session key K2 before transmission. After that the MS and the application in the bank again notice that the agreed interval has been reached and both parties recalculate the security parameters, for example, the session key K3, using the shared secret and the latest sequence number 3.

Figure 4:
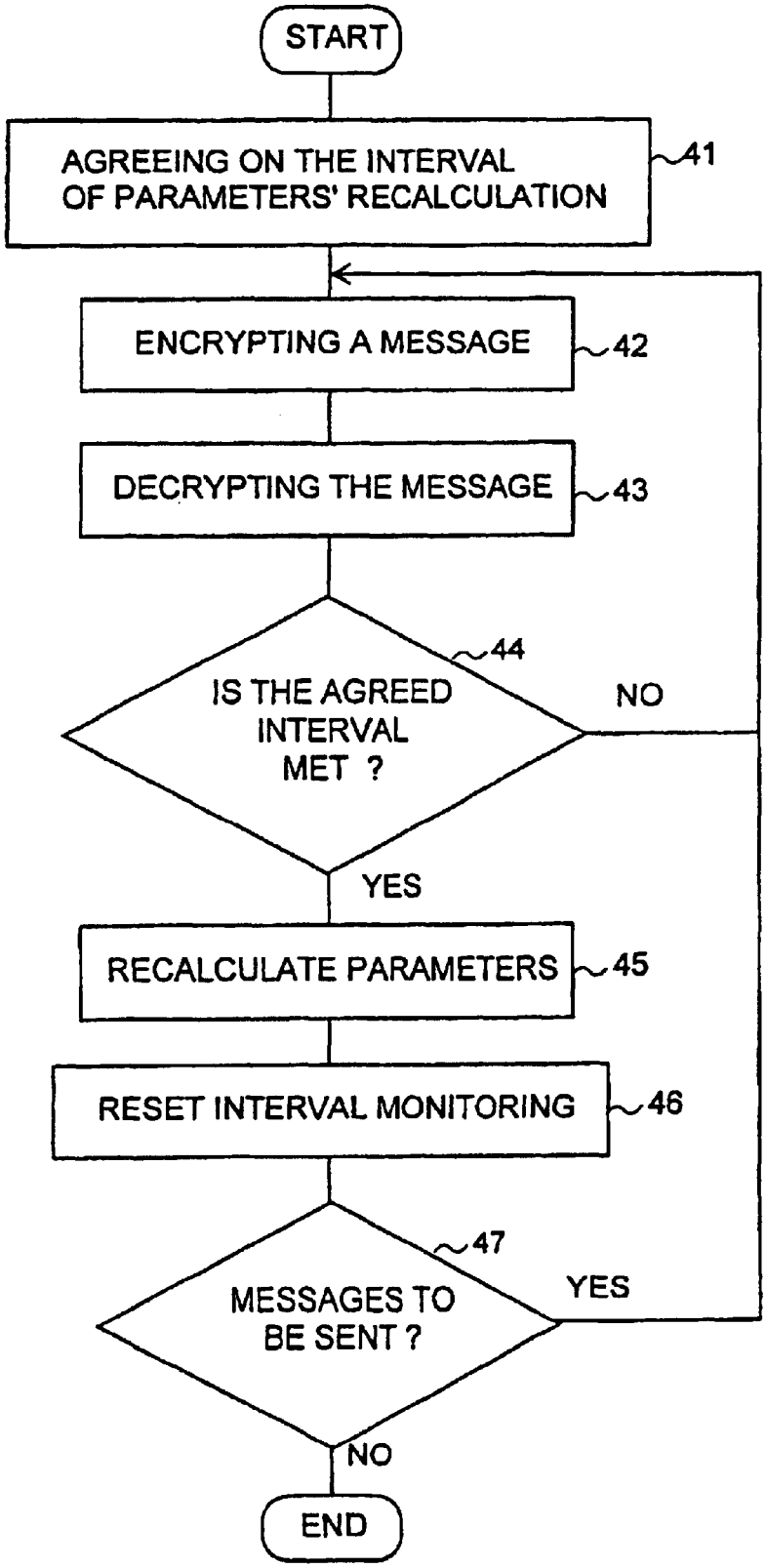
FIG. 4 shows the primary embodiment of the invention as a flowchart.

FIG. 4 shows the primary embodiment of the invention as a flowchart. At the beginning of a communication at step 41, the parties involved in communication, in the example in FIG. 2 the MS and the application in the bank, negotiate and agree on the interval for security parameters recalculation. As in the example described above, we again assume that the interval is agreed to be after two transmitted messages. Both communicating parties keep track of the number of transmitted messages, for example, with counters at each end. At stage 42 one of the communicating parties, for example, the MS, encrypts the first message to be sent with a session key K1 obtained from the shared secret that was exchanged during the handshake or other-wise shared with the parties involved. The encrypted message is sent and the receiving party decrypts the message with corresponding session key K1 (stage 43). At this time the counter is set at 1. At stage 44 both parties, in this example the MS and the application in the bank, check whether the agreed interval has been reached by checking whether the value in the counter is equal to the value of the agreed interval, for example. As the message sent was only the first message, recalculation does not take place yet, and the next message is encrypted and decrypted with the same session key K1. When two messages have been sent, and the counters indicate the value 2 which corresponds to the value of the agreed interval, the clause at stage 44 becomes true and both communicating parties recalculate security parameters in a predetermined manner and obtain a new session key K2 (stage 45). At stage 46 the interval monitoring is reset, i.e. the message count is restarted, for example, by setting the counter to 0. At stage 47 a check is made as to whether there are still more messages to be sent, and if so the encryption of a message is continued at stage 42 with the first message to be encrypted using the latest session key K2, after which the message is sent and the counters may be set to value 1. The process continues in similar manner until all the messages to be sent are transmitted.

In another embodiment of the invention, MAC is used to provide connection security for message transmission in the place of ciphering. According to the invention MAC is calculated, from the sequence number that last triggered recalculation of the security parameters, for example. In the example in FIG. 3, MAC is calculated with the sequence number 1 for the messages shown as encrypted with K2 and with the sequence number 3 for the messages to be encrypted with K3. Otherwise this other embodiment of the invention is implemented in the same fashion as in the first embodiment described above.

Yet another embodiment of the invention uses ciphering and MAC to provide connection security for messages. This is implemented by combining the embodiments described above.

Recalculation of the security parameters includes also the possibility of changing the ciphering algorithm to be used in ciphering the next messages.

The drawings and the accompanying explanation are only intended to demonstrate the principles of the invention. The details of the method according to the invention can vary within the patent claims. Although the invention was described above mostly in connection with a mobile station and service application communication, the invention can also be used for providing connection security for messages between any two or more applications communicating together, also in mobile to mobile connection in a speech, data and short message transmission. The invention is also suitable for use in recalculating other security parameters than session keys and MACs. The invention is not restricted for use only in connection with the ciphering algorithms presented above, but can be applied together with any ciphering algorithms.

What is claimed is:

1. A method for providing connection security for the transmission between communicating parties in a telecommunication network, the method comprising the steps of:

exchanging security parameters between communicating parties, providing connection security for messages based on these security parameters, transmitting said messages between communicating parties, wherein the method further comprises the steps of:

reaching agreement between communicating parties on an interval for recalculation of the security parameters, monitoring of the interval for recalculation by the communicating parties, recalculating the security parameters at the agreed interval, and providing connection security for messages based on the latest recalculated security parameters.

2. The method according to claim 1, wherein providing connection security for messages based on the latest recalculated security parameters comprises the step of ciphering messages based on the latest recalculated security parameters.

3. The method according to claim 1, wherein providing connection security for messages based on the latest recalculated security parameters comprises the step of authenticating and providing integrity for the messages based on the latest recalculated security parameters.

4. The method according to claim 1, wherein providing connection security for messages based on the latest recalculated security parameters comprises the steps of ciphering messages based on the latest recalculated security parameters, and authenticating and providing integrity for the messages based on the latest recalculated security parameters.

5. The method according to claim 3, wherein authenticating and providing integrity for the messages is arranged with a message authentication code MAC.

6. The method according to claim 1, wherein the method further comprises the steps of:

numbering the messages, agreeing on the number of messages to determine the interval for the recalculation of the security parameters, recalculating the security parameters after the agreed number of messages have been transmitted.

7. The method according to claim 6, wherein the method further comprises the steps of:

numbering the messages with sequence numbers, transmitting the sequence number with the message, and using the latest sequence number as input for recalculation of the security parameters.

8. The method according to claim 1, wherein the method comprises the step of reaching agreement between communicating parties during handshaking on the interval for recalculation of the security parameters.

*9. A mobile station configured to*

*exchange security parameters with at least one communicating party,*

*negotiate an agreement with the at least one communicating party on an interval for recalculation of security parameters,*

*monitor the interval for recalculation,*

*recalculate the security parameters at the agreed interval, and*

*providing connection security for messages transmitted between the mobile station and the at least one communicating party based on the latest calculated security parameters.*

*10. The mobile station according to claim 9, configured to cipher messages based on the latest recalculated security parameters.*

*11. The mobile station according to claim 9, configured to authenticate and provide integrity for messages based on the latest recalculated security parameters.*

*12. The mobile station according to claim 9, configured to cipher, authenticate and provide integrity for messages based on the latest recalculated security parameters.*

*13. The mobile station according to claim 11, wherein the messages are authenticated and integrity for the messages is provided with a message authentication code.*

*14. The mobile station according to claim 9, configured to*

*number the messages,*

*agree on a number of messages for determining the interval for the recalculation of security parameters, and*

*recalculate the security parameters after the agreed number of messages have been transmitted.*

*15. The mobile station according to claim 14, configured to*

*number the messages with sequence numbers,*

*transmit a respective sequence number with a message, and*

*use the latest sequence number as input for recalculation of the security parameters.*

*16. The mobile station according to claim 9, configured to negotiate and reach an agreement with said at least one communicating party during handshaking on the interval for recalculation of the security parameters.*

*17. A server configured to*

*exchange security parameters with at least one communicating party,*

*negotiate an agreement with the at least one communicating party on an interval for recalculation of security parameters,*

*monitor the interval for recalculation,*

*recalculate the security parameters at the agreed interval, and*

*provide connection security for messages transmitted between the server and the at least one communicating party based on the latest calculated security parameters.*

*18. The server according to claim 17, configured to cipher messages based on the latest recalculated security parameters.*

*19. The server according to claim 17, configured to authenticate and provide integrity for messages based on the latest recalculated security parameters.*

*20. The server according to claim 17, configured to cipher, authenticate and provide integrity for messages based on the latest recalculated security parameters.*

*21. The server according to claim 19, wherein the messages are authenticated and integrity for the messages is provided with a message authentication code.*

*22. The server according to claim 17, configured to*

*number the messages,*

*agree on a number of messages for determining the interval for the recalculation of security parameters, and*

*recalculate the security parameters after the agreed number of messages have been transmitted.*

*23. The server according to claim 22, configured to*

*number the messages with sequence numbers,*

*transmit a respective sequence number with a message, and*

*use the latest sequence number as input for recalculation of the security parameters.*

*24. The server according to claim 17, configured to negotiate and reach an agreement with said at least one communicating party during handshaking on the interval for recalculation of the security parameters.*

*25. A mobile station comprising*

*means for exchanging security parameters with at least one communicating party,*

*means for negotiating an agreement with the at least one communicating party on an interval for recalculation of security parameters,*

*means for monitoring the interval for recalculation,*

*means for recalculating the security parameters at the agreed interval, and*

*means for providing connection security for messages transmitted between the mobile station and the at least one communicating party based on the latest calculated security parameters.*

*26. A server comprising*

*means for exchanging security parameters with at least one communicating party,*

*means for negotiating an agreement with the at least one communicating party on an interval for recalculation of security parameters,*

*means for monitoring the interval for recalculation,*

*means for recalculating the security parameters at the agreed interval, and*

*means for providing connection security for messages transmitted between the server and the at least one communicating party based on the latest calculated security parameters.*

*27. A method of operating a mobile station, the method comprising*

*exchanging security parameters with at least one communicating party,*

*negotiating an agreement with the at least one communicating party on an interval for recalculation of security parameters,*

*monitoring the interval for recalculation,*

*recalculating the security parameters at the agreed interval, and*

*providing connection security for messages transmitted between the mobile station and the at least one communicating party based on the latest calculated security parameters.*

*28. A method of operating a server, the method comprising*

*exchanging security parameters with at least one communicating party,*

*negotiating an agreement with the at least one communicating party on an interval for recalculation of security parameters,*

*monitoring the interval for recalculation,*

*recalculating the security parameters at the agreed interval, and*

*providing connection security for messages transmitted between the server and the at least one communicating party based on the latest calculated security parameters.*

*29. A telecommunications network comprising at least two parties arranged to communicate with each other and to provide connection security, the at least two parties configured to*

*exchange security parameters with each other,*

*negotiate an agreement on an interval for recalculation of security parameters,*

*monitor the interval for recalculation,*

*recalculate the security parameters at the agreed interval, and*

*provide connection security for messages transmitted between the at least two communicating parties based on the latest calculated security parameters.*

*30. A telecommunications network comprising a server and at least one mobile station, the server and the at least one mobile station configured to*

*exchange security parameters with each other,*

*negotiate an agreement on an interval for recalculation of security parameters,*

*monitor the interval for recalculation,*

*recalculate the security parameters at the agreed interval, and*

*provide connection security for messages transmitted between the server and the at least one mobile station on the latest calculated security parameters.*

*31. A telecommunications network comprising at least two mobile stations, the at least two mobile stations configured to*

*exchange security parameters with each other,*

*negotiate an agreement on an interval for recalculation of security parameters,*

*monitor the interval for recalculation,*

*recalculate the security parameters at the agreed interval, and*

*provide connection security for messages transmitted between the at least two mobile station on the latest calculated security parameters.*

* * * * *